(12) United States Patent
Yun

(10) Patent No.: US 7,071,933 B2
(45) Date of Patent: Jul. 4, 2006

(54) POWER CONTROLLING SYSTEM

(75) Inventor: Yeo Sung Yun, Gumi-si (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 10/706,049

(22) Filed: Nov. 13, 2003

(65) Prior Publication Data
US 2004/0135569 A1    Jul. 15, 2004

(30) Foreign Application Priority Data
Nov. 15, 2002    (KR) .................... 10-2002-0071053

(51) Int. Cl.
  *G09G 5/00* (2006.01)
(52) U.S. Cl. ..................... 345/211; 307/17; 307/39

(58) Field of Classification Search ................ 345/211, 345/212, 214, 215; 713/320, 324, 340; 307/17, 307/30, 31, 39
See application file for complete search history.

(56) References Cited

U.S. PATENT DOCUMENTS

| | | | |
|---|---|---|---|
| 6,184,875 B1 * | 2/2001 | Matsuura | ..................... 345/211 |
| 6,812,921 B1 * | 11/2004 | Hsu | ..................... 345/211 |
| 2005/0057558 A1 * | 3/2005 | Cho | ..................... 345/213 |

\* cited by examiner

*Primary Examiner*—Jessica Han
(74) *Attorney, Agent, or Firm*—Birch Stewart Kolasch & Birch LLP

(57) ABSTRACT

The present invention relates to a power controlling system for a display. When Display Power Management signals, i.e., DPMF/DPMS signals, output from Micom, the controller, are all "Low" and "Low", a main power switch is turned off. Therefore, power is not supplied to a secondary side of a main transformer and only the Micom is provided with power. As a result, the display enters to a power off mode, wherein power consumption is less than 1 Watt.

49 Claims, 6 Drawing Sheets

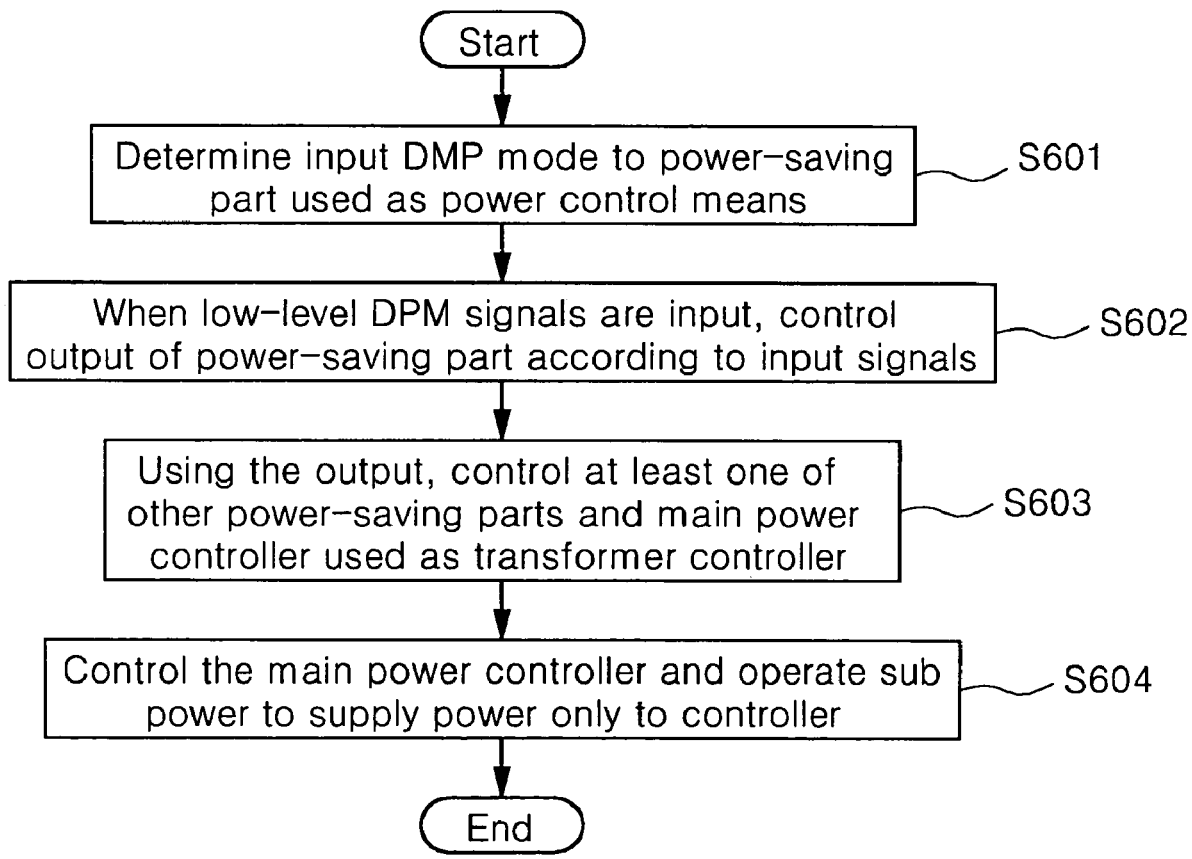

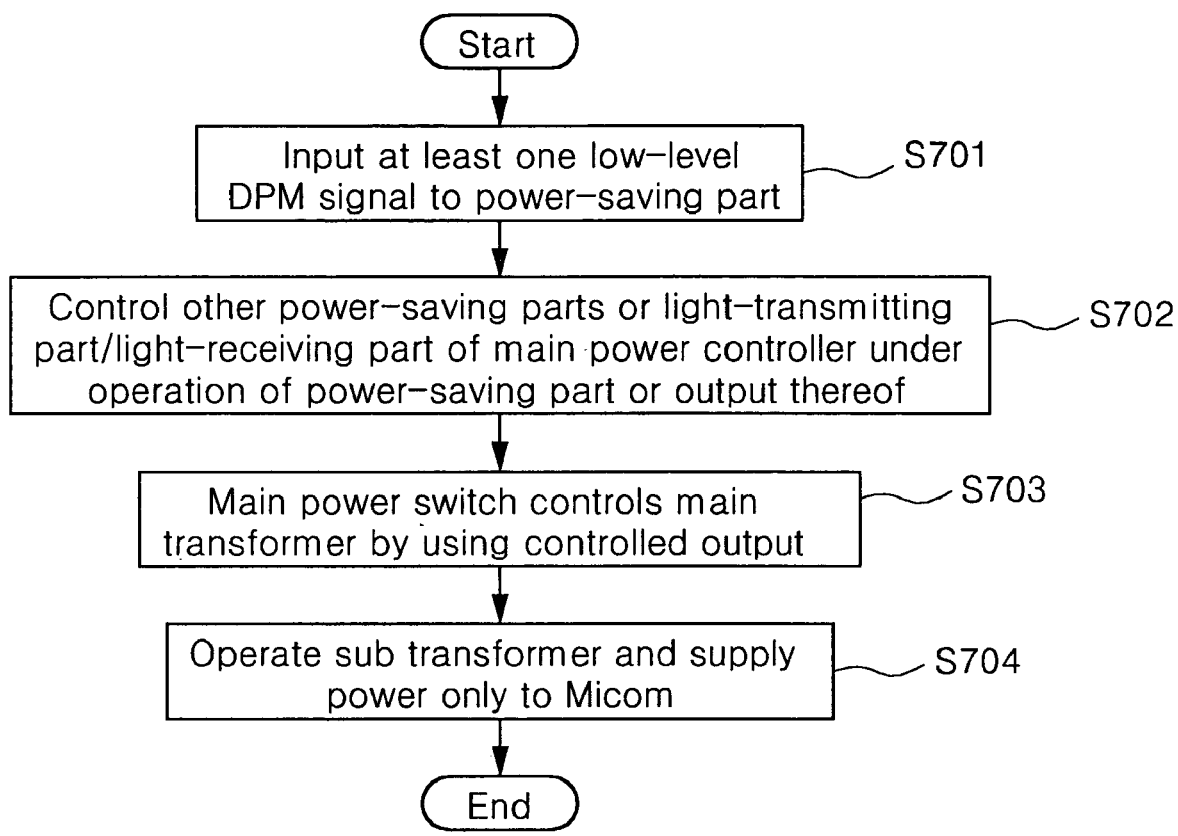

POWER CONTROLLING SYSTEM

This Nonprovisional application claims priority under 35 U.S.C. § 119(a) on Patent Application No(s). 10-2002-0071053 filed in Korea on Nov. 15, 2002, the entire contents of which are hereby incorporated by reference.

BACKGROUND OF THE INVENTION

1. Field of the Invention

The present invention relates to a power controlling system of a display monitor, more particularly, to a power controlling system of a computer monitor and a method thereof, capable of minimizing power consumption for automatically converting a monitor power mode to a power off mode in case that the computer is not used for a certain period of time.

2. Discussion of the Background Art

In general, when a computer is not used for a certain period of time, a power supply circuit in the computer monitor automatically switches a power mode of the computer to a power saving mode until a user presses any key on a keyboard, thereby saving unnecessary power consumption. Recent monitors in the current market mostly have this function.

FIG. 1 is a circuit diagram of a related art power supply circuit of a monitor. The discussion on the related art power supply circuit follows below.

As depicted in FIG. 1, the power supply circuit includes a power input 100 for decompressing input power (AC), a noise filter 110 for filtering noises using output voltage of the power input 100 when a power switch SW1 is turned on, a rectifier 120 for rectifying the output voltage of the noise filter 100 at a bridge diode (BD1) and a condenser C1 and for dividing the rectified voltage Vd through resistors R1 to R3, a power switch 140 for outputting a switching signal by means of voltage division of the rectifier 120, and a voltage output 130 for outputting DC voltage by inducing an output of the rectifier to a secondary side transformer T1 according to an output of the power switch 140.

The problem of the above power supply circuit is that unless the user turns off the power of the monitor, power is continuously supplied to the monitor even when the user is not currently using the computer. As a result, element lifespans in the circuit are dramatically shortened, and thus the reliability of the power supply circuit is lowered.

As an attempt to solve this problem, Korean patent application No. 10-1998-0048370 disclosed an embodiment of a power-saving circuit.

FIG. 2 is a circuit diagram of a power-saving circuit disclosed in the above patent application.

Referring to the drawing, the power-saving circuit includes a rectifier 200 for rectifying and smoothing AC power, a power factor controller 210 for outputting the AC power as power factor-compensated DC voltage, power controllers 220 and 240 for controlling a plurality of transformers, having them output a plurality of different voltages from the applied DC voltage, Micom 270 for controlling the overall power circuit and for outputting a plurality of DPM Display Power Management) control signals in DPM mode, power-saving parts 250 and 260 for outputting a heater power or light emitting signal in response to the DPM control signal, and a main power switch 230 for supplying or switching off power voltage Vcc applied to the power controller 200 under the light emitting signal.

The power-saving circuit satisfies the 2000 IECC, i.e. its power is set at 3 Watt in the power off mode.

However, this type of power-saving circuit does not satisfy the European regulations, Blue Angel, requiring the power consumption in the power off mode to be less than 1 Watt.

This is because even in the off mode, the sub power controller 240, the Micom power (+B7), and the heater power (+B8) continue their operation by an output of the rectifier, by the sub power, and by the first power-saving part, respectively.

SUMMARY OF THE INVENTION

An object of the invention is to solve at least the above problems and/or disadvantages and to provide at least the advantages described hereinafter.

Accordingly, one object of the present invention is to solve the above problems by providing a power controlling system for a computer, whose power consumption in a power off mode is less than 1 Watt.

The foregoing and other objects and advantages are realized by providing a power controlling system, including: a power supply means for rectifying and/or compensating an input power; a plurality of transformers for receiving power from the power supply means and for outputting a voltage therefrom; a controller for controlling a power circuit and for outputting a plurality of DPM control signals according to DPM mode; a power control means connected to the transformers and the controller, for controlling power to other elements except the controller according to the DPM mode; and a transformer controller for outputting power to control the transformers under the control of the power control means.

Another aspect of the invention provides a power controlling system having a main transformer and a sub transformer, which, in response to a first and second DPM signals output from a display controller, induces from a AC voltage being input from outside at least one voltage for use in a display from secondary sides of the main transformer and the sub transformer and outputs the induced voltages, wherein the system includes: a first power-saving part connected to an arbitrary point of a secondary side of the main transformer, for outputting a predetermined voltage in response to the first DPM signal output from the controller; a second power-saving part connected to an arbitrary point of a secondary side of the main transformer, for outputting a predetermined voltage in response to the second DPM signal output from the controller; a third power-saving part connected to the first and second power-saving parts, which turns off as the first power-saving part is turned off; a main power switch connected to one end of a primary side of the main transformer, for controlling an operation of the main transformer; and a transformer controller for controlling an operation of the main power switch according to an operation of the second power-saving part.

Another aspect of the invention provides a power controlling method, which includes the steps of: determining an input DPM mode to a power-saving part used as a power control means; when input DPM signals are all low level signals, controlling an output of the power-saving part according to the input signals; under an operation of the power-saving part or an output thereof, controlling at least one of the power-saving part, another power-saving part, and a transformer controller used as a main power controller; and after controlling the main power controller, operating a sub power to supply power only to the controller.

According to the invention, in a power off mode, only Micom is being turned on and the rest of elements are all turned off Power consumption of a display in the power off mode is less than 1 Watt, which satisfies the European regulations, Blue Angel.

Moreover, by using two types of power supply, e.g., a main transformer and a sub transformer, and by distinguishing an applied voltage to Micom from other applied voltages to the rest of IC, the operation of the Micom is more stabilized.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a diagram illustrating a first and second DMP signals according to respective DPM (Display Power Management) modes of Micom;

FIG. 6 is an operational flow chart of a power supply circuit according to the present invention; and FIG. 7 is an operational flow chart of a power supply circuit of the present invention when DPM mode is low.

DETAILED DESCRIPTION OF PREFERRED EMBODIMENTS

Figure 1:
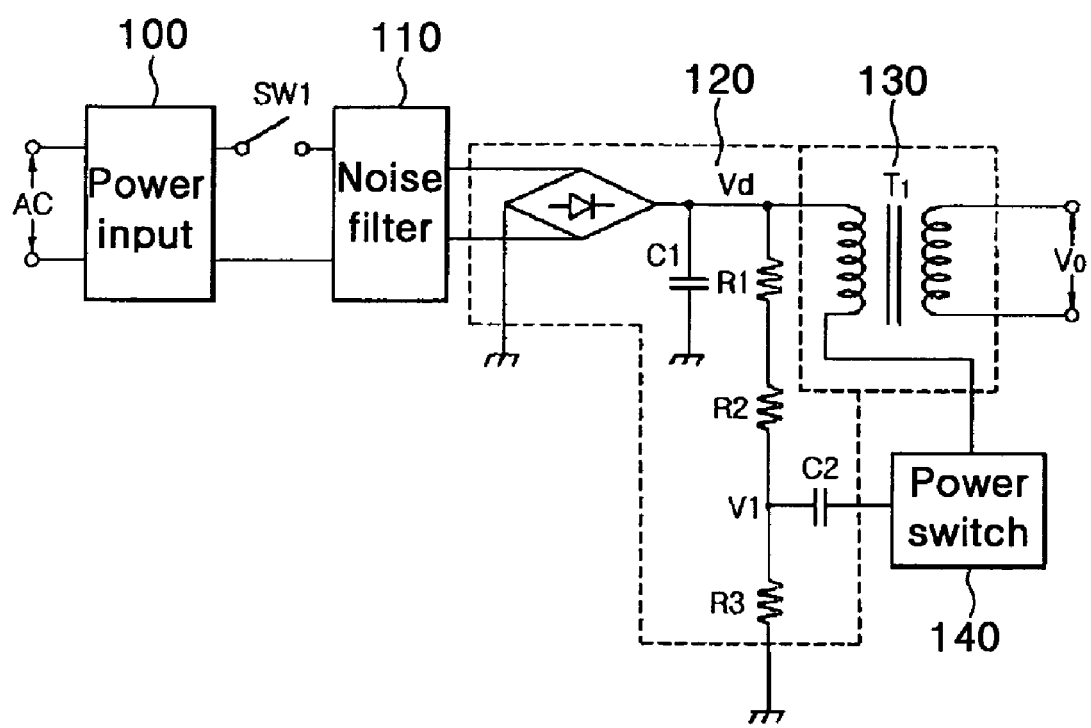
FIG. 1 is a schematic block diagram illustrating a power supply circuit for a monitor according to a related art.
Figure 2:
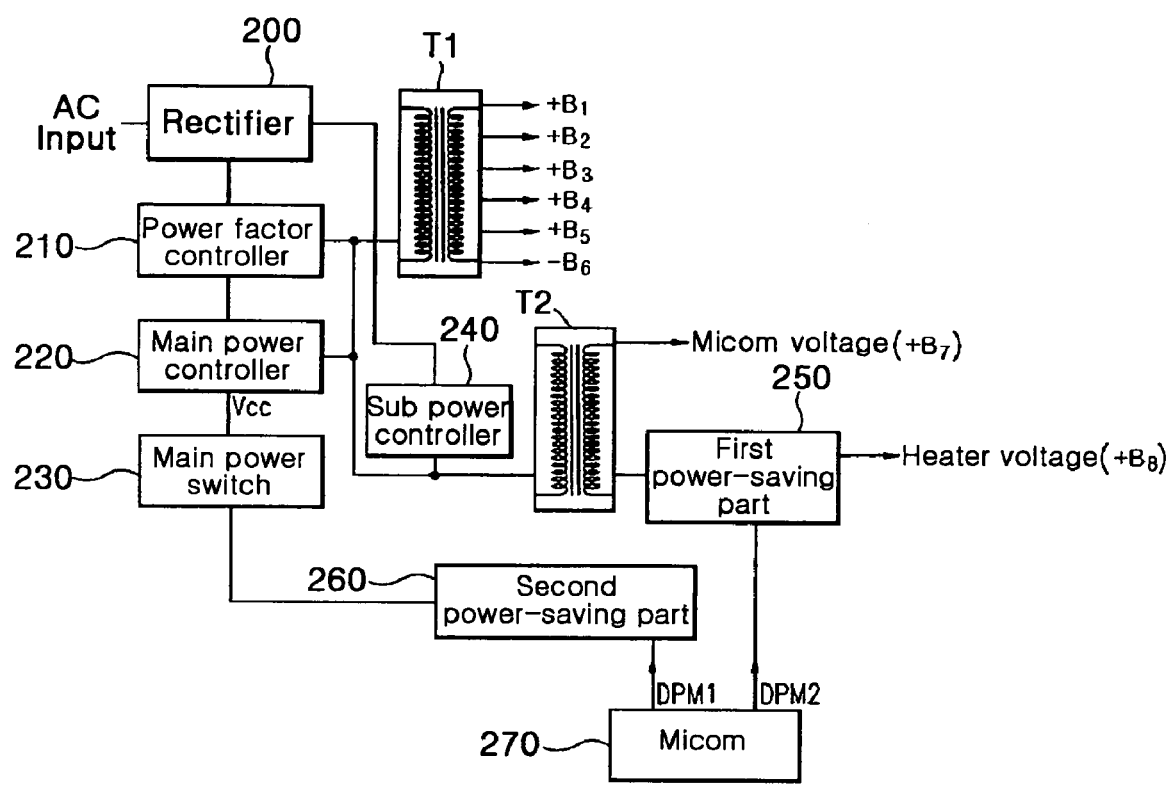
FIG. 2 is a schematic block diagram illustrating a power supply circuit with a power saving function according to a related art.

The following detailed description will present a power controlling system according to a preferred embodiment of the invention in reference to the accompanying drawings wherein like parts and components are designated by the same reference numerals to avoid duplicating description.

FIGS. 3 through 7 show the organization and the operation of the power supply circuit for a monitor.

At first, different types of power used in the circuit are identified as follows:

+B1 denotes horizontally deflected DC/DC Converter input power; +B2 denotes video output circuit power; +B3 denotes horizontal/vertical power; +B4 denotes other circuit power; +B5 denotes vertical IC driving power; and +B6 denotes heater power.

Figure 3:
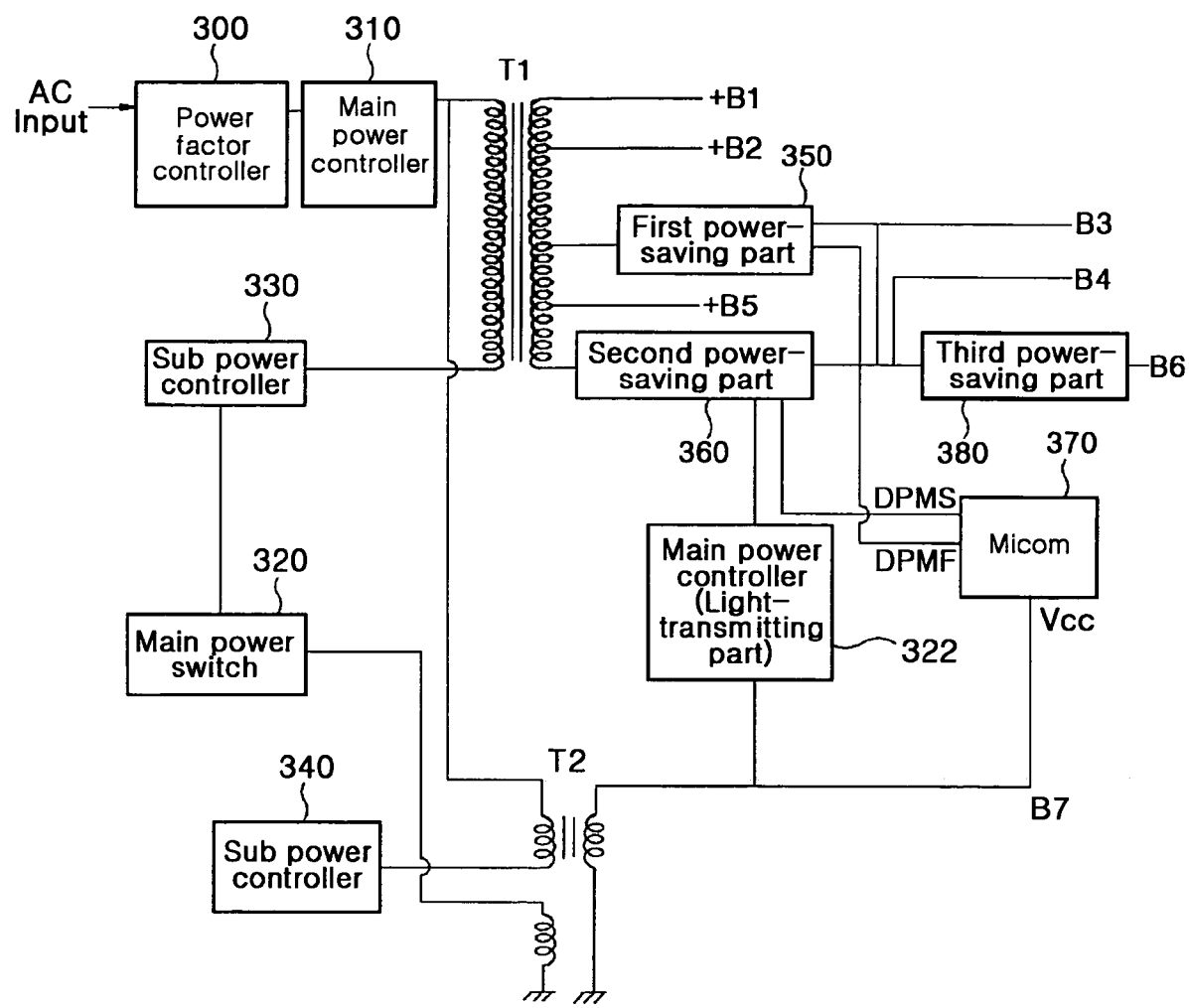
FIG. 3 is a schematic block diagram illustrating a power supply circuit for a monitor according to a preferred embodiment of the present invention.
Figure 4:
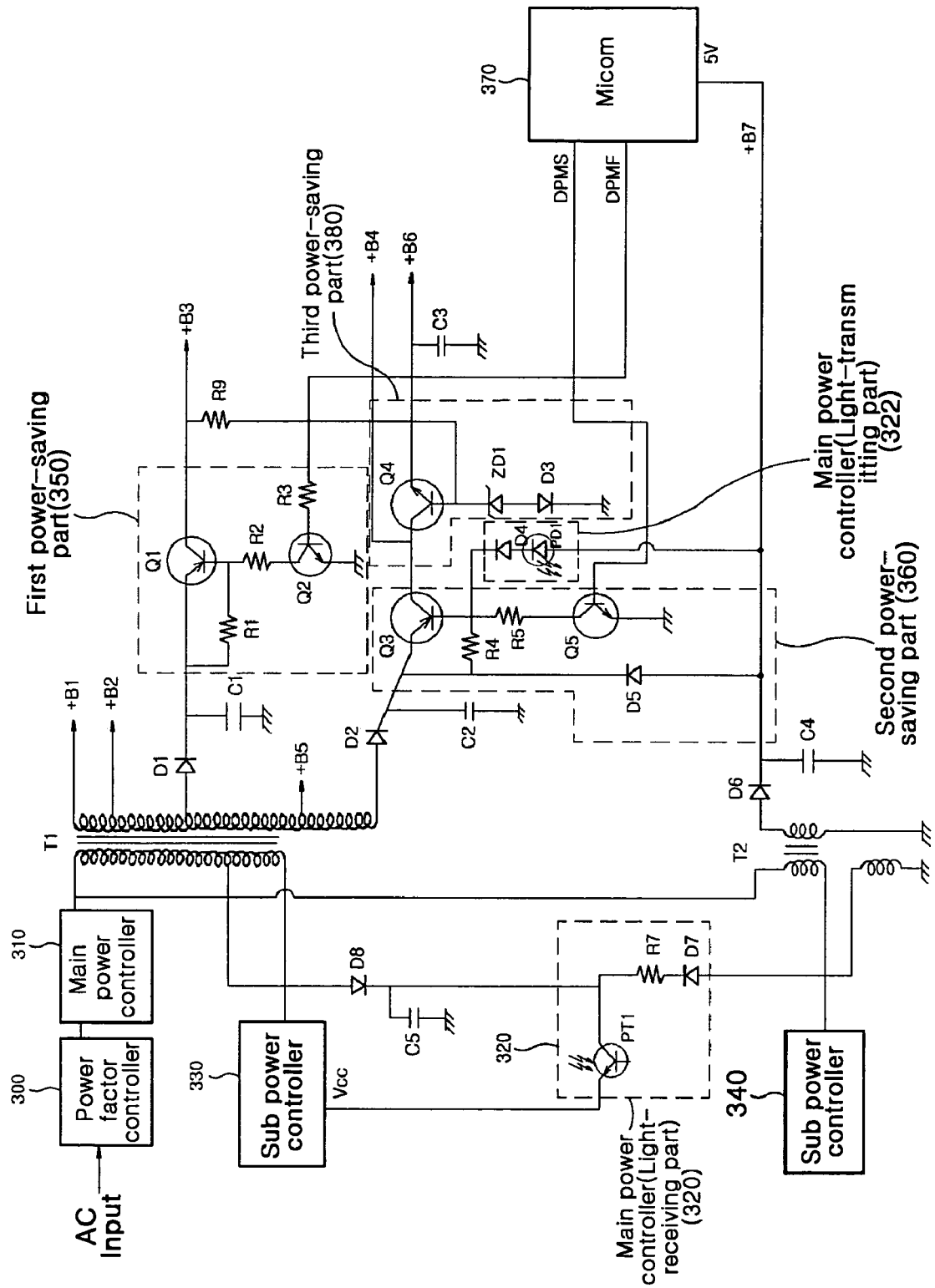
FIG. 4 is a detailed view of FIG. 3.

FIG. 3 is a schematic block diagram illustrating a power supply circuit for a monitor according to a preferred embodiment of the present invention; and FIG. 4 is a detailed view of FIG. 3.

Referring to FIG. 3 and FIG. 4, the power controlling system according to the present invention includes a main transistor T1, a sub transistor T2, a power factor controller 300, a rectifier 310, a main power switch 330, a main power controller consisting of a light-transmitting part 322 and a light-receiving part 320, a sub power controller 340, a first power-saving part 350, a second power-saving part 360, a third power-saving part 380, and Micom 370.

The power factor controller 300 and the rectifier 310 are connected between an input power and a primary side of the main transistor T1, compensating power factor of the AC power that is input from outside, rectifying and smoothing the AC power, and finally supplying the DC voltage to the main transformer T1.

The primary side of the main transformer T1 and the sub transformer T2 receive DC voltage from the rectifier 310, and output to the secondary sides different voltages to be used for each circuit in the monitor.

One end of the primary side of the main transformer T1 is connected to the rectifier 310 and the other end is connected to the main power switch 330. On the other hand, one end of the primary side of the sub transformer T2 is connected to the rectifier 310 and the other end is connected to the sub power controller 340.

The first power-saving part 350 is connected to an arbitrary position of the secondary side of the main transformer T1, and in DPM mode, outputs a designated voltage (+B3) in response to a DPMF display Power Management First) signal from the Micom 370.

The first power-saving part 350 includes transistors Q1 and Q2, and resistors R1, R2 and R3. The emitter of the transistor Q1 is connected to an arbitrary position of the secondary side of the main transformer T1 via a diode D1, the collector of the transistor, which is an output terminal, outputs the +B3 voltage, and the base is connected to the collector of the transistor Q2 through the resistor R2. The base of the transistor Q2 is where a first DPM signal (DPMF signal) of the Micom is input via the resistor R3. The emitter of the transistor Q2 is put to earth. The resistor R1 is inserted between the emitter and the base of the transistor Q1.

Preferably, the transistor Q1 and Q2 is a PNP transistor and a NPN transistor, respectively.

The second power-saving part 360 is connected to an arbitrary position of the secondary side of the main transformer T1, and in DPM mode, outputs a designated voltage (+B4) in response to a second DPM signal (DPMS signal) from the Micom 370.

The second power-saving part 360 includes transistors Q3 and Q5, a diode D5, and resistors R4 and R5.

The transistors Q3 and Q5 are preferably a PNP transistor and a NPN transistor, respectively. The emitter of the transistor Q3 is connected to an arbitrary point of the secondary side of the main transformer T1 via a diode D2, the base of the transistor Q3 is connected to the collector of the transistor Q5 via the resistor R5, and the collector of the transistor Q3, which is an output terminal, outputs the +B4 voltage.

The base of the transistor Q5 is where a second DPMS signal from the Micom is input, the collector of the transistor Q5 is connected to the base of the transistor Q1 via the resistor R5, and the emitter of the transistor Q5 is earthed.

The resistor R4 is inserted between the emitter and the base of the transistor Q3. The cathode of the diode D5 is connected to the emitter of the transistor Q3, and the anode of the diode D5 is connected to the secondary side of the sub transformer T2 via the diode D6.

The third power-saving part 380 is connected to the output end of the first and second power-saving parts 350 and 360, and outputs a designated voltage (+B6).

The third power-saving part 380 includes a transistor Q4, a Zener diode ZD1, and a diode D3.

The transistor Q4 is preferably a NPN transistor. The base of the transistor Q4 is connected to the collector of the first power-saving part 350 via a resistor R9, the collector of the third power-saving part 380 is connected to the collector of the transistor Q3 of the second power-saving part 360, and the emitter of the third power-saving part, which is an output terminal, outputs the +B6 voltage.

The anode of the Zener diode ZD1 is connected to the anode of the diode D3, and the cathode of the Zener diode ZD1 is connected to the base of the transistor Q4. The anode of the diode D3 is connected to the anode of the Zener diode ZD1, and the cathode of the diode D3 is earthed.

As discussed before, the main power controller includes the light-transmitting part 322 and the light-receiving part 320. The light-transmitting part 322 is connected to one end of the second power-saving part and to the secondary side of the sub transformer T2. The light-receiving part 320 is connected to the main power switch 330 and to the tertiary side of the sub transformer T2. As shown in FIG. 4, the light-transmitting part 322 includes a diode D4 and a photo diode PD1, and the light-receiving part 320 includes a diode D7, a resistor R7, and a phototransistor PT1. The photo diode PD1 of the light-transmitting part and the phototransistor PT1 of the light-receiving part are used as a light-emitting element and a light-receiving element, respectively.

The cathode of the diode D4 is connected to the base of the transistor Q3 of the second power-saving part, and the anode of the diode D4 is connected to the cathode of the photo diode PD1.

The anode of the photo diode PD1 is connected to the secondary side of the sub transformer T2 via the diode D6. The phototransistor PT1, together with the photo diode PD1, composes a photo coupler. The emitter of the phototransistor PT1 is connected to Vcc of the main power switch 330, and the collector of the phototransistor PT1 is connected to the cathode of the diode D7 via the resistor R7.

The anode of the diode D7 is connected to one end of the tertiary side sub transformer T2.

The main power switch 330 is turned on or off, being controlled by an output signal from the light-receiving part 320 of the main power controller. The input voltage Vcc to the main power switch 330 is connected to the emitter of the phototransistor PT1 of the light-receiving part 320.

An operation of the power controlling system with the above-discussed organization is now provided below.

In DPM mode, the power controlling system controls the first and second power-saving parts according to the first DPM signal (DPMF signal) and the second DPM signal (DPMS signal) from the Micom, and using at least one output of the first and second power-saving parts, controls the third power-saving part and/or the main power controller.

When the first and second power-saving parts are off, photocurrent of the main power controller is cut off. As a result thereof, the main power switch is off and no voltage (e.g., +B1 through +B6) is induced to the secondary side of the main transformer T1, so the system is set in a power off mode.

Further details on the operation of the power controlling system of the present invention in DPM mode are as follows.

When an AC voltage is applied to the power factor controller 300, the power factor controller 300 compensates the power factor of the AC voltage and applies the AC voltage to the rectifier 310. The rectifier 310 converts the AC voltage to a DC voltage, and supplies the DC voltage to the primary side of the main transformer T1 and the primary side of the sub transformer T2. The power supplied to the primary side of the main transformer T1 is controlled by the main power switch 330 that is in turn controlled by the main power controller. On the other hand, the power supplied to the primary side of the sub transformer T2 is controlled by the sub power controller 340.

FIG. 5 is a diagram illustrating a first and a second DPM signal in DPM mode. As shown in FIG. 5, in normal mode, the first DMPF signal is high and the second DMPS signal is also high.

Also, in standby mode, the first DPMF signal is low and the second DMP signal is high.

Lastly, in off mode, the first and second DMP signals are low.

More specifically, (1) when the DPM mode is in normal mode, the first DMPF signal output from the Micom is a high level signal. Thus the transistor Q2 of the first power-saving part 350 is turned on, and the +B3 voltage is supplied. Accordingly, the voltage is fed to the base of the transistor Q4 of the third power-saving part 380, so the transistor Q4 is turned on and the +B6 voltage is supplied.

Likewise, since the second DPMS signal is a high level signal, the transistor Q5 and the transistor Q3 of the second power-saving part 360 are turned on, and as a result thereof, the +B4 and +B6 voltage are output.

In addition, the voltage on the base of the transistor Q3 is lowered, and thus, a current flows in the photo diode PD1 of the light-transmitting part 322, turning on the photo diode PD1. Therefore, the phototransistor PT1 of the light-receiving part 320 is turned on, and as a result thereof, the voltage Vcc is supplied to the main power switch 330.

Accordingly, energy is transferred to the secondary side of the main transformer T1, and B1, B2, B3, B4, B5, B6 and B7 voltages are supplied thereby.

(2) When the DPM mode is in standby mode, the first DPMF signal from the Micom is in a low level while the second DPMS signal from the Micom is in a high level.

Since the second DPMS signal is a high level signal, the transistors Q5 and Q3 of the second power-saving part 360 are turned on, and as a result thereof, the +B4 voltage is output. Moreover, the voltage on the base of the transistor Q3 is lowered, and thus, a current flows in the photodiode PD1 of the light-transmitting part 322. Therefore, the phototransistor PT1 of the light-receiving part 320 of the main power controller is turned on, and the voltage Vcc is supplied to the main power switch 330. Accordingly, energy is transferred to the secondary side of the main transformer T1, and B1, B2, B4, B5 and B7 voltages are supplied thereby.

The +B3 and +B6 voltages are not output because the first DPMF signal is a low level signal.

(3) When the DPM mode is in off mode, the first DPMF signal and the second DPMS signal from the Micom are all low level signals.

Since the first DPMS signal is a low level signal, the transistor Q1 of the first power-saving part 350 goes off and the +B3 voltage is not output. As a result thereof, the transistor Q4 of the third power-saving part is turned off and the +B6 voltage is not output, either.

Also, since the second DPMS signal is a low level signal, the transistor Q5 of the second power-saving part 360 is turned off. As a result thereof, the transistor Q3 is turned off and the +B4 voltage is not output. As the voltage on the base of the transistor Q3 is increased, the photo coupler Ph1, which is a photo diode for the light-transmitting part 322 and for the light-receiving part 320, is turned off, and thus, Vcc is not supplied to the main power switch 330. Therefore, no voltage can be induced to the secondary side of the main transformer T1, and the +B1, +B2, and +B5 voltages are not output.

Accordingly, in off mode, the +B1 through +B6 voltages are off, and the power mode of the monitor becomes the power off mode to which the +B7 voltage only is applied.

FIG. 6 is an operational flow chart of a power supply circuit according to the present invention.

DPM mode being input to a power-saving part or power output control means is determined (S601).

Here, input DPM signals are the first DPMF signal and the second DPMS signal, and depending on the signal, the DPM mode can be in standby mode or in off mode.

When the input DPM signals are all low-level signals, an output of the power-saving part is controlled according to the input signal (S602).

By the operation or output of the power-saving part, the power-saving part, other power-saving part, and the main power controller that controls the transformer are all or respectively controlled (S603).

As a transistor of the power-saving part to which low DPM signals are applied is controlled, a base voltage of the corresponding transistor is increased. Then, a main power controller including a light-transmitting part is controlled and only sub power is supplied to a controller (S604).

FIG. 7 is an operational flow chart of a power supply circuit of the present invention when DPM mode is low.

At least one DPM signals, i.e., DPMF and DPMS signals, are input to a power-saving part as low level signals (S701).

By the operation or output of the power-saving part, the power-saving part, other power-saving part, and the main power controller including the light-transmitting and light-receiving parts are all or respectively controlled (S702).

Using a controlled output by the main power controller, a main power switch controls a main transformer (S703), and a sub transformer supplies power only to Micom, i.e., the controller (S704).

As described above, according to the power controlling system of the present invention, when the DPMF/DPMS signals are output in "Low" and "Low" levels, the transistor Q5 is turned off, the base voltage of the transistor Q3 is increased higher than +B6 voltage. This cuts off the current to the PD1 322 so the PT1 320 and the main power switch are turned off.

Accordingly, +B1 to +B6 voltages are not supplied and only B7 voltage, which is the Micom voltage, is supplied. Hence, the monitor enters to the power off mode.

The power consumption of the display in power off mode is less than 1 Watt (e.g., 120 mA of the Micom×5V=0.6W).

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power controlling system, comprising:
    a power supply means for rectifying and/or compensating an input power;
    a plurality of transformers for receiving power from the power supply means and for outputting a voltage therefrom;
    a controller for controlling a power circuit and for outputting a plurality of DPM control signals according to DPM mode;
    a power control means connected to the transformers and the controller, for controlling power to other elements except the controller according to the DPM mode; and
    a transformer controller for outputting power to control the transformers under the control of the power control means.

2. The system according to claim 1, further comprises a main power switch for controlling the transformers by an output of the transformer controller.

3. The system according to claim 1, wherein the power supply means comprises a power factor controller and a rectifier, which are connected between an input power and a primary side of a main transformer, for feeding an output voltage to the main transformer by compensating a power factor and/or smoothing an input power from outside.

4. The system according to claim 1, wherein the transformers comprises a main transformer and a sub transformer, and a primary side thereof receives a DC voltage from the rectifier and a secondary side thereof outputs at least one voltage for use in each circuit in a display.

5. The system according to claim 4, wherein one end of the primary side of the main transformer is connected to the rectifier and the other end is connected to a main power switch.

6. The system according to claim 4, wherein one end of the primary side of the sub transformer is connected to the rectifier and the other end is connected to a sub power controller.

7. The system according to claim 4, wherein the power control means comprises at least one power-saving part that is connected to an arbitrary point of a secondary side of the main transformer, and another separate power-saving part connected to the at least one power-saving part.

8. The system according to claim 7, wherein a first power-saving part out of the at least one power-saving part is connected to an arbitrary point of the secondary side of the main transformer, and outputs a predetermined voltage in response to a first DPMF signal that is output from the controller or Micom according to a DPM mode.

9. The system according to claim 8, wherein the first power-saving part comprises at least one transistor (Q1, Q2) and at least one resistor.

10. The system according to claim 9, wherein an emitter of Q1 is connected to an arbitrary point of a main transformer via a diode (D1).

11. The system according to claim 9, wherein a collector of Q1 is an output terminal for outputting a predetermined voltage, and a base of Q1 is connected to a collector of Q2 via a resistor.

12. The system according to claim 9, wherein a DPMF signal, which is a first DPM signal of Micom the controller, is input to the base of Q2 via a resistor.

13. The system according to claim 9, wherein the transistor Q1 and Q2 is a PNP transistor and a NPN transistor, respectively.

14. The system according to claim 7, wherein a second power-saving part out of the at least one power-saving part is connected to an arbitrary point of the secondary side of the main transformer, and outputs a predetermined voltage in response to a DPMS signal that is a second DPM signal output from Micom the controller according to a DPM mode.

15. The system according to claim 14, wherein the second power-saving part comprises at least one transistor (Q3, Q5), a diode (D5), and at least one resistor.

16. The system according to claim 15, wherein the transistor Q3 and Q5 is a PNP transistor and a NPN transistor, respectively.

17. The system according to claim 16, wherein an emitter of Q3 is connected to an arbitrary point of a secondary side of a main transformer via a diode (D2).

18. The system according to claim 16, wherein a base of Q3 is connected to a collector of Q5 via a resistor.

19. The system according to claim 16, wherein a second DPMS signal of Micom is input to a base of Q5.

20. The system according to claim 16, wherein a collector of Q5 is connected to a base of Q3 via a resistor.

21. The system according to claim 16, wherein a resistor is inserted between an emitter and a base of Q3.

22. The system according to claim 15, wherein a cathode of the diode is connected to an emitter of Q3, and an anode of the diode is connected to a secondary side of a sub transformer via a different diode.

23. The system according to claim 7, wherein a third power-saving part out of the at least one power-saving part is connected to the first power-saving part and/or the second power-saving part, and outputs a predetermined voltage.

24. The system according to claim 23, wherein the third power-saving part comprises at least one of a transistor Q4, a Zener diode (ZD1), and a diode (D3).

25. The system according to claim 24, wherein the transistor is a NPN transistor.

26. The system according to claim 25, wherein a base of the transistor is connected to a collector of a first power-saving part via a resistor.

27. The system according to claim 25, wherein a collector of the transistor is connected to a collector of Q3 of a second power-saving part.

28. The system according to claim 24, wherein an anode of the Zener diode (ZD1) is connected to an anode of the diode (D3), and a cathode of the Zener diode is connected to a base of Q4.

29. The system according to claim 24, wherein an anode of the diode (D3) is connected to an anode of the Zener diode (ZD1).

30. The system according to claim 1, wherein the transformer controller comprises at least one of a light-transmitting part and a light-receiving part.

31. The system according to claim 30, wherein the light-receiving part is connected to one end of the second power-saving part and to the secondary side of the sub transformer.

32. The system according to claim 30, wherein an operation of the light-transmitting part is controlled by an operation of the second power-saving part.

33. The system according to claim 30, wherein the light-transmitting part comprises a diode (D4) and a photo diode (PD1).

34. The system according to claim 33, wherein a cathode of the diode is connected to a base of Q3 of a second power-saving part, and an anode of the diode is connected to a cathode of the photo diode (PD1).

35. The system according to claim 33, wherein an anode of the photo diode (PD1) is connected to a secondary side of a sub transformer via a diode (D6).

36. The system according to claim 30, wherein the light-receiving part is connected to a main power switch and a tertiary side of a sub transformer.

37. The system according to claim 30, wherein the light-receiving part comprises at least one of a diode (P7), a resistor (R7), and a phototransistor (PT1).

38. The system according to claim 37, wherein an emitter of the phototransistor (PT1) is connected to a power of a main power switch, and a collector of the phototransistor (PT1) is connected to a cathode of the diode via the resistor.

39. The system according to claim 37, wherein an anode of the diode is connected to one end of a tertiary side of a sub transformer (T2).

40. The system according to claim 30, wherein a photo diode (PD1) of the light-transmitting part and a phototransistor (PT1) of the light-receiving part are used as a light-emitting element and a light-receiving element of a photo coupler, respectively.

41. A power controlling system having a main transformer and a sub transformer, which, in response to a first and second DPM signals output from a display controller, induces from a AC voltage being input from outside at least one voltage for use in a display from secondary sides of the main transformer and the sub transformer and outputs the induced voltages, the system comprising:
    a first power-saving part connected to an arbitrary point of a secondary side of the main transformer, for outputting a predetermined voltage in response to the first DPM signal output from the controller;
    a second power-saving part connected to an arbitrary point of a secondary side of the main transformer, for outputting a predetermined voltage in response to the second DPM signal output from the controller;
    a main power switch connected to one end of a primary side of the main transformer, for controlling an operation of the main transformer; and
    a transformer controller for controlling an operation of the main power switch according to an operation of the second power-saving part.

42. The system according to claim 41, further comprising:
    a third power-saving part connected to the first and second power-saving parts, wherein the third power-saving part is turned off when the first power-saving part is turned off.

43. The system according to claim 41, wherein when an applied signal from the transformer controller to the second power-saving part is a low level signal, a corresponding switching means is turned off, and an applied voltage to the transformer controller becomes greater than a voltage of another switch connected to the switching means.

44. The system according to claim 43, wherein when DPMF/DPMS signals from the transformer controller is "Low" and "Low", Q5 Transistor of the second power-saving part is turned off, and a base voltage of Q3 becomes greater than an applied voltage (+B7) to the transformer controller, cutting off a current to a PD1, whereby a PT1 and a main power switch are turned off.

45. The system according to claim 41, further comprises a sub power controller for controlling the sub transformer that operates by an applied voltage from a rectifier.

46. The system according to claim 45, wherein the transformer controller's voltage is output, being induced by an applied voltage to a primary side of the sub transformer.

47. A power controlling method, comprising:
    determining an input DPM mode to a power-saving part used as a power control means;

when input DPM signals are all low level signals, controlling an output of the power-saving part according to the input signals;

under an operation of the power-saving part or an output thereof, controlling at least one of the power-saving part, another power-saving part, and a transformer controller used as a main power controller; and after controlling the main power controller, operating a sub power to supply power only to the controller.

48. The method according to claim 47, wherein input DPM signals are first and second DPMS signals.

49. A power controlling method, comprising:

inputting at least one low-level DPM signal to a power-saving part;

controlling the power-saving part, another power-saving part, or a light-transmitting part/a light-receiving part of a main power controller, under an operation of the power-saving part or an output thereof;

controlling a main transformer, in a main power switch, by using the controlled output; and operating a sub transformer to apply a voltage only to Micom used as a controller.

* * * * *